UNITED STATES PATENT OFFICE.

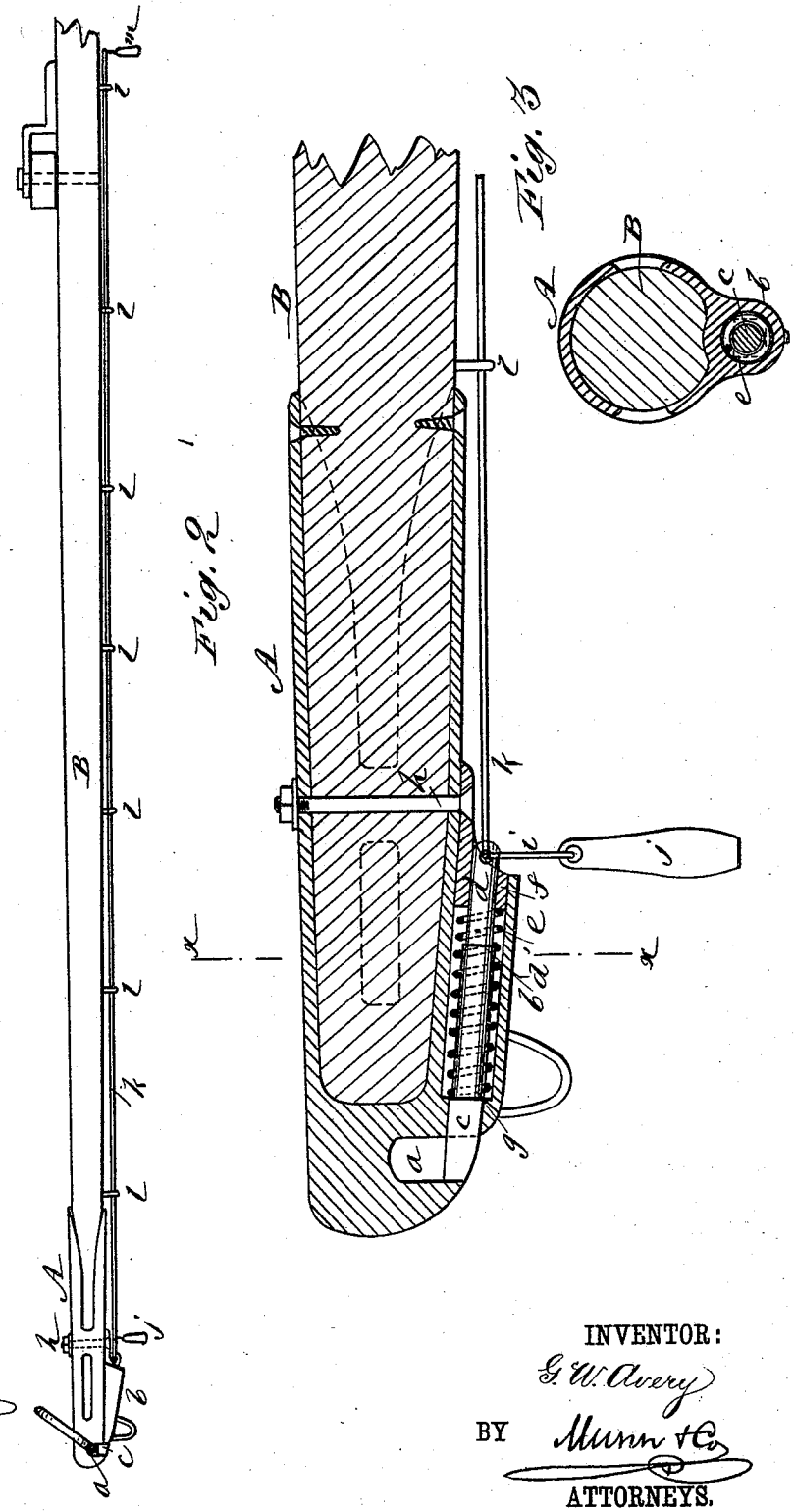

GEORGE W. AVERY, OF FORT RANSOM, DAKOTA TERRITORY.

WAGON-TONGUE.

SPECIFICATION forming part of Letters Patent No. 353,048, dated November 23, 1886.

Application filed March 26, 1886. Serial No. 196,666. (No model.)

*To all whom it may concern:*

Be it known that I, GEORGE W. AVERY, of Fort Ransom, in the county of Ransom, Dakota Territory, have invented a new and useful Improvement in Tongue Ends, of which the following is a specification, reference being had to the annexed drawings, forming a part thereof, in which—

Figure 1 is a side elevation of a portion of a vehicle-tongue, showing the application of my improvement. Fig. 2 is an enlarged longitudinal section. Fig. 3 is a transverse section taken on line $x$ $x$ in Fig. 2.

Similar letters of reference indicate corresponding parts in the different figures of the drawings.

In ordinary tongue ends and fasteners for receiving neck-yoke rings parts of the tongue end project beyond the neck-yoke ring, so that the lines and straps of the harness are liable to catch on the tongue end and interfere with the management of the team.

The object of my invention is to obviate this difficulty and to provide a tongue end which will securely hold the neck-yoke ring, and which will admit of the ready release of the neck-yoke by moving a handle at either end of the tongue.

My invention consists in a socket fitted to the end of a tongue, and provided with a notched end in which the neck-yoke ring is received, and with a spring-acted bolt for closing the notch in the end, and a rod connected with the bolt, extending nearly the entire length of the tongue, and provided with handles by which the rod and the bolt may be moved.

The socket A, which is made of malleable or cast iron, or other suitable material, is adapted to receive the end of the tongue B. The projecting end of the socket A is made solid, and is provided in its under side with a notch, $a$, for receiving the neck-yoke ring. On the under surface of the socket A is formed a casing, $b$, for the bolt $c$, which extends across the notch $a$, and closes the mouth thereof.

The bolt $c$ is provided with a round shank, $d$, which is surrounded by a spiral spring, $e$, abutting on a centrally-apertured plug, $f$, inserted in the end of the casing $b$. The opposite end of the spring $e$ bears against the shoulder $g$, formed on the bolt $c$, and tends to press the bolt forward, so as project its larger end into the notch $a$, thus locking the neck-yoke ring in the notch. That portion of the shank $d$ passing through the plug $f$ is reduced, forming a stop, $d'$, which prevents the bolt $c$ from being drawn too far out.

The end of the plug $f$ is reduced in thickness, and is secured in place by a bolt, $h$, which passes through the end of the plug through the socket A and the tongue end. The rear end of the bolt $c$ projects beyond the plug $f$, and receives a link, $i$, to which is attached a handle, $j$. It also receives one end of a rod, $k$, which extends through staples $l$, projecting from the under surface of the tongue, and is provided with a handle, $m$, near the draw-bolt. By drawing upon either of the handles $j$ $m$ the bolt $c$ may be withdrawn from the notch $a$, and the neck-yoke ring held by the notch will be released.

It will be observed that the end of the socket A does not project beyond the neck-yoke ring sufficiently to engage any of the parts of the harness; also, that the socket and bolt are both rounded, so as to present a smooth curved outline, which affords no chance for the catching of parts of the harness.

My improved tongue end permits the driver to release the neck-yoke ring in case of the breakage of the whiffletrees or other accident, thus avoiding injury to the team or to the vehicle and its load.

Although the driver can release the tongue from the neck-yoke ring, yet the tongue cannot drop down until so released, thereby preventing accidents that might occur by the tongue dropping out of ring when the team is in motion.

Having thus described my invention, what I claim as new, and desire to secure by Letters Patent, is—

1. The combination, with the socket A, provided with a notch, $a$, near the end thereof, and having a bolt-casing, $b$, formed integrally with it, of the spring-acted bolt $c$, contained by the casing and adapted to close the notch $a$, the end of the socket and bolt being rounded to present a smooth curved outline, substantially as herein shown and described.

2. The combination, with the socket A, provided with the notch $a$, and having the bolt-casing $b$ formed thereon, of the bolt $c$, the spring $e$, the rod $k$, and the handles $j$ $m$, substantially as herein shown and and described.

GEORGE W. AVERY.

Witnesses:
PAUL B. RANES,
E. S. ELLIS.